(12) United States Patent
Kulkarni et al.

(10) Patent No.: US 7,622,545 B2
(45) Date of Patent: Nov. 24, 2009

(54) POLYESTER RESINS WITH A SPECIAL CO-CATALYST FOR HIGH MELT POLY AND SSP REACTIVITY WITH ENHANCED COLOR VALUES

(75) Inventors: Sanjay Tammaji Kulkarni, Chennai (IN); Balasundaram Dilly Raj, Chennai (IN)

(73) Assignee: Futura Polyesters Ltd, Mumbai (IN)

( * ) Notice: Subject to any disclaimer, the term of this patent is extended or adjusted under 35 U.S.C. 154(b) by 284 days.

(21) Appl. No.: 11/471,764

(22) Filed: Jun. 21, 2006

(65) Prior Publication Data

US 2006/0293493 A1 Dec. 28, 2006

(30) Foreign Application Priority Data

Jun. 22, 2005 (IN) .................................. 04/1190

(51) Int. Cl.
*C08G 64/00* (2006.01)
*C08G 63/02* (2006.01)

(52) U.S. Cl. .................... 528/285; 264/176.1; 264/219; 428/34.1; 428/35.7; 502/150; 528/271; 528/272

(58) Field of Classification Search ............. 264/176.1, 264/219; 428/34.1, 35.7; 502/150; 528/272, 528/27, 285

See application file for complete search history.

(56) References Cited

U.S. PATENT DOCUMENTS

| 4,064,112 | A   | * | 12/1977 | Rothe et al. ................. 528/272 |
| 5,241,046 | A   | * | 8/1993  | Shiraki et al. ............... 528/499 |
| 7,094,863 | B2  | * | 8/2006  | Moore et al. ................ 528/272 |
| 2005/0203267 | A1 | * | 9/2005 | Jernigan et al. ............. 528/271 |

FOREIGN PATENT DOCUMENTS

WO WO 2004104080 * 12/2004

* cited by examiner

*Primary Examiner*—Terressa M Boykin
(74) *Attorney, Agent, or Firm*—Charles A. Muserlia

(57) ABSTRACT

The present invention relates to a PET resin and a process for producing polyethylene terephthalate (PET) resin having conventional catalysts such as antimony, titanium, tin or germanium compounds and a glycol insoluble tungsten compound or tungsten trioxide or tungsten carbide as co-catalyst. The tungsten compound as a co catalyst increases the rates of solid state polymerization and improves the 'L' color value.

18 Claims, 1 Drawing Sheet

Figure 1:
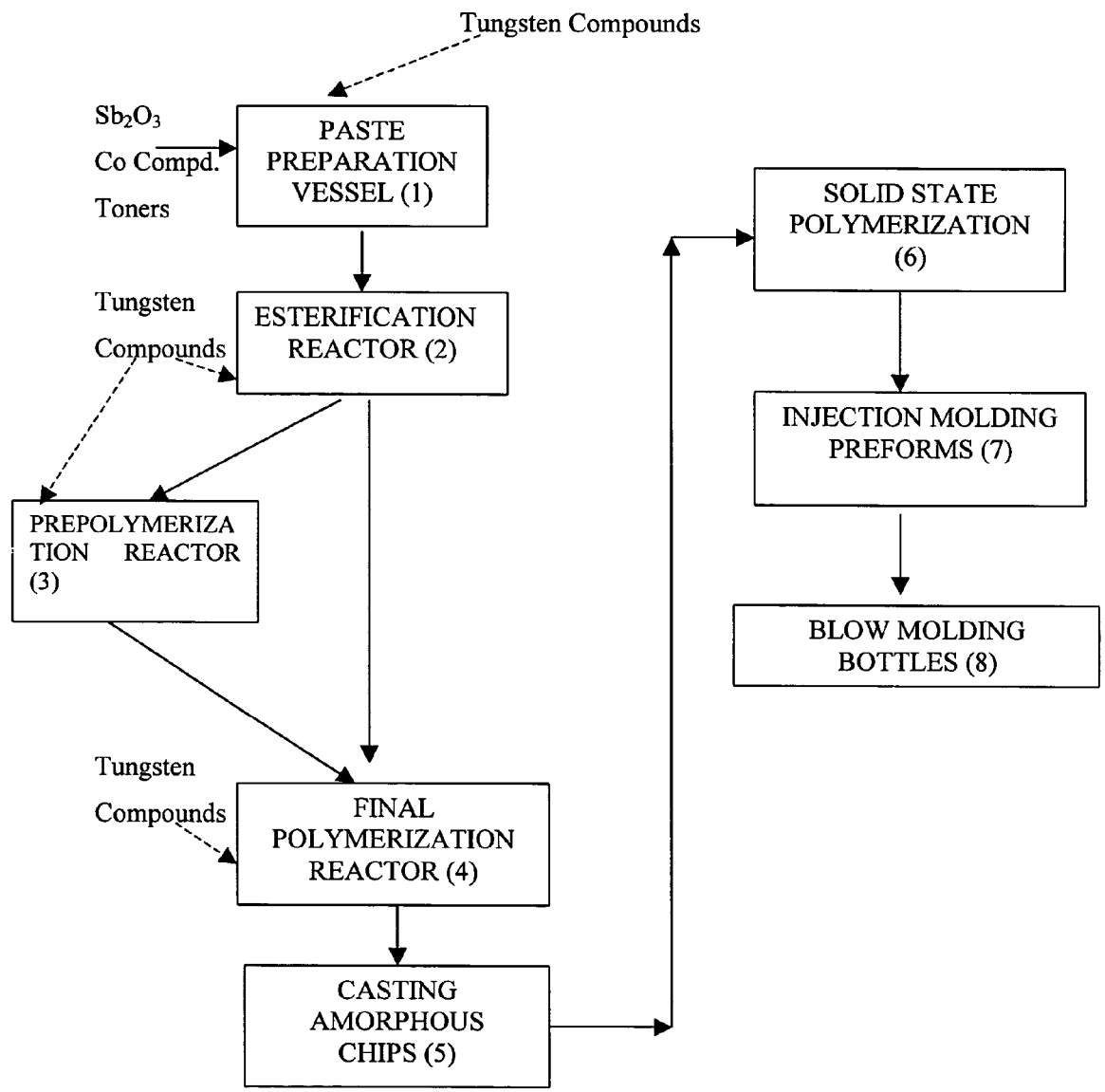

POLYESTER RESINS WITH A SPECIAL CO-CATALYST FOR HIGH MELT POLY AND SSP REACTIVITY WITH ENHANCED COLOR VALUES

BACKGROUND OF THE INVENTION

1. Technical Field

The present invention relates to production process for a Polyester Resin. In particular, this invention relates processes for manufacturing polyester resins. Still particularly, this invention relates to a catalyst system for manufacturing polyester resins.

2. Background and Prior Art

Carothers and Hill in the late 1920s were the first to form fiber forming polyester resins using the melt condensation of dicarboxylic acids and aliphatic diols. Poly(ethylene terephthalate) [PET] was invented in the 1940s by Winfield and Dickson and suggested its use for fiber and film formation.

This invention particularly relates to PET resins but is not restricted to PET resins and extends to related Polyester resins such as polyethylene naphthalate (PEN), polybutylene naphthalate (PBN) and polytrimethylene naphthalate (PTN) and process of preparing these resins. Although, the description and examples will be described with reference to PET resin, it will be appreciated by one skilled in the art that the results and processes can be extended to other polyester resins.

PET is produced by two routes: the dimethyl terephthalate route, [DMT] route, which involves the use of ethylene glycol and dimethyl terephthalate. The process requires a high degree of purity of the monomer. With the availability of sufficient quantities of purified terephthalic, [PTA], increasingly, the $2^{nd}$ route, PTA route, has now become more popular.

a. The PTA route of making the polyester resin such as PET follows a series of steps involving intermolecular reactions between bi-functional and poly-functional compounds: In the first step a paste is made of the acid by preparing in a vessel, a paste comprising:

(i) diacid component, typically a solid, selected from a group consisting of Terephthalic Acid (TPA) and Naphthalene Dicarboxylic Acid (NDA) or a diester component consisting of dimethyl ester of the acid viz. Dimethyl Naphthalene Dicarboxylate (NDC) and (ii) diol component, typically a liquid, selected from a group consisting of mono ethylene glycol (MEG), Trimethylene Glycol, 1,3-Propylene Diol (PDO) and Tetramethylene Glycol, Butylene Glycol and 1,4-Butane Diol (BDO).

In the case of PTA and ethylene glycol [EG] the paste is charged in a typically a first esterification stirred tank reactor maintained at around 230 to 280 degrees Celsius and pressure in the range of 0.5 to 3.0 $kg/cm^2$ and for a period ranging between 3 and 4 hours, resulting in an esterification process leading to the formation of a prepolymer, consisting of bis-hydroxyethyl terephthalate [BHET] and short chain oligomers. The esterification is not complete and some acid end groups remain in the prepolymer. Water, an esterification by-product, is removed by a column system and [EG] is recycled.

The first esterification step resulting in the prepolymer is typically followed by a polycondensation step in which a trans-esterification and an esterification reaction leads to step-growth polymerization in the melt phase. These reactions are reversible and require that the condensates [EG] and water are efficiently removed from the melt, typically by using reduced pressure. Initially, when the melt viscosity remains relatively low, the condensate products can be removed easily by evaporation. However, as the viscosity increases bubble formation is hindered and diffusion of EG is required. This may be also achieved by using a disk ring reactor to reduce the diffusion path, creating a thin renewable film thereby increasing the surface area and removing the condensates. A three stage reaction may also be utilized in which the esterification is carried out at a temperature in the range of about 230 to 260° C. and pressure in the range of 0.1 to 0.5 $kg/cm^2$ and for a period ranging between 2 to 2.5 hours while maintaining inert atmosphere using nitrogen circulation, followed by pre polymerization carried out at reduced pressure in the range of 5 and 15 mbar and at a temperature in the range of 260 and 285° C. for a period of about 30 minutes, and ending by polymerization carried out at a reduced pressure in the range of 0.1 to 0.5 mbar at a temperature in the range of 280 and 298° C., preferably between 280 and 285° C. for a period ranging between 100 and 155 minutes.

At the end of the reaction the melt can be used directly for making fibers. However, in melt polymerization it is difficult to obtain PET of number average molar mass Mn greater than 20,000 g/mole [intrinsic viscosity, IV ~0.6 dL/g] needed for making bottles and industrial fibers, because of reduced mass transfer rates and chemical degradation at high temperatures and long residence time. However in the disc ring reactor it is possible to reach I.V. of ~0.8 without degradation, and with more antimony catalyst even higher. Therefore, it is usual to follow melt polymerization by solid state polymerization [SSP]. The melt is extruded into strands which solidify on cooling and the strands are cut into essentially amorphous chips for the post polymerization process. In SSP the amorphous chips are first subjected to crystallization at 100 to 170 degrees C. to avoid sticking during the subsequent processing at higher temperatures. The crystalline material is then charged into the SSP reactor at 200 to 230 degrees C., typically 50 degrees C. lower than the melt phase reaction. The reactions in SSP are essentially the same as in the melt phase except that the reaction takes place in the solid phase. EG is removed either by nitrogen sweeping or by application of reduced pressure or vacuum. Reaction temperature drop reduces the polycondensation rate by a factor of 6, while the chemical degradation rate drops by a factor of 40. Moreover, problems associated with stirring of the viscous melt are eliminated and much more important is the reduction of acetaldehyde. PET for instance, of average molar mass Mn upto 27,000 g/mole [intrinsic viscosity, IV ~0.8 dL/g] [for bottles] and as high as 38,000 g/mole [intrinsic viscosity, IV ~1.20 dL/g] [for industrial fibers] can be achieved.

It is now well known that use of one or more catalysts during ester interchange and polycondensation both in melt polymerization and in solid state polymerization speeds up the rate of polymerization. Sequestering agents, typically phosphorus compounds, are required particularly in transesterification reactions to control catalyst activity to prevent thermal degradation and discoloration of the resultant polymer. U.S. Pat. Nos. 2,641,592, 3,028,366, 3,732,182, 3,795,639 3,842,043, 3,907,754, 3,962,189, 3,965,071, 4,010,145, 4,082,724, 5,008,230, 5,019,640, 5,116,938, 5,162,488 and 5,166,311 and JP 2000086751 all deal with processes for preparing linear polyesters utilizing variety of catalysts comprising Germanium, Antimony, Titanium, Manganese, Cobalt, Zinc, Magnesium, Calcium, Aluminum, Bismuth, Iron, Copper etc. and variety of phosphorous containing compounds as heat stabilizers.

Various additives are reported in the literature for increasing the SSP rate. U.S. Pat. Nos. 6,699,545 and 5,644,019 teach use of zinc p-toluenesulfonate as SSP rate accelerators.

Polyfunctional compound additives like trimellitic anhydride (TMA), pyromellitic dianhydride (PMDA) etc. are known as SSP accelerators as described in U.S. Pat. Nos. 5,338,838, 5,334,669 and 5,243,020 and EU 422282.

U.S. Pat. No. 5,382,650 describes a process wherein Tungsten Sulfide ($WS_2$) in combination with intercalated alkali metal cations like Lithium is used as an esterification and/or transesterification catalyst and the product is for molding applications.

Japanese Patent Application 56020028 (1981) uses ethylene glycol soluble tungsten compounds like Tungstic Acid, Tungsten Chloride, Tungsten pentaphenoxide etc along with polycondensation catalysts like Antimony Trioxide, Germanium dioxide, Zinc acetate etc. and claims an improvement in color and a reduction in melt polymerization time. A significant limitation of the process disclosed in this application is that the L value with Tungstic Acid as the additive along with Antimony Trioxide shows a drop in the value from 75.1 (without the Tungstic Acid additive) to 74.3, though it is not significant.

In our invention the tungsten compound used, though insoluble, has shown considerable decrease not only in melt polymerization time but also a significant improvement in L value. Additionally we have seen an increase in the SSP rate about which there is no mention in the Japanese patent. One of the reasons for the insoluble tungsten compound which has been very effective in our invention can be due to the fine particle size (~4 micron) which gets thoroughly dispersed in the polymer melt and manifests its catalytic effect both in melt poly and SSP.

Again, in JP 5674123 (1981)—the inventors have used glycol soluble Tungstic Acid, Tungsten Chloride and Tungsten Pentaphenoxide. To improve the color they have used additionally phosphorous compounds. They have been able to achieve an accelerated melt polymerization rate and disclose consistently high L values—all in the range of 80 to 82.

When the experiments were repeated by the herein inventors with Tungstic Acid it showed acceleration in melt poly but there was no increase the SSP rate.

Again, in JP 61293220 (1986) a process of polymerization with tungstic Acid is disclosed wherein a heating medium, either paraffin, or one or more compounds of biphenyl derivatives, is added along with the raw materials containing Tungsten compound and the regular catalysts and the agitation is by blowing inert gas like nitrogen. According to this disclosure one need not do SSP and with this process they are able to reach a minimum viscosity of 2.3. There is no mention of rate of polymerization and color of polymer. This work is more academic in nature as industrially this process is not practical because contact of the heating medium directly with the polymer melt will give rise to contaminant problems.

JP 2117950 (1990) discloses a process for PET preparation for film application with Tungsten Trioxide grains with an average size of 0.01 to 5 micron. They claim excellent transparency in the film. This process deals with Melt polymerization but there is no mention of rate, or L Values. Also this application anticipates the important feature of particle size as mentioned earlier in our invention.

U.S. patent applications 20050153086 dated Jul. 14, 2005, 20040236066 dated Nov. 25, 2004 and 20050261462 dated Nov. 24, 2005 deal with slow crystallizing resins, resins for application such as hot fill beverage containers and titanium catalyzed polyester resins respectively; and they have claimed the use of Tungsten compounds as one of the several heat up rate additives loaded in a carrier resin as master batch for achieving improved reheating profile in performs through blending of this master batch; the dosage of the tungsten compounds or other additives are not recommended for addition in melt phase reactor but only as a master batch in injection molding machine; the resin is also a copolymer with added comonomers. There is no suggestion in this patent application for the use of the catalyst system in the solid state polymerization step of the reaction.

The underlying theory on which this invention is based is the fact that compared to melt polymerization, there is significantly less degradation of the polymer in solid state polymerization and higher intrinsic viscosity build up. If the solid state polymerization rate is accelerated, then apart from the fact that there will be greater productivity, there will also be lesser degraded product as a result of decreased time of thermal exposure. This lesser degradation results in lower generation of acetaldehyde.

None of the above mentioned prior art references, provides an additive for specifically improving the solid state polymerization rate and concomitantly having no effect on the L value if not an improved L value.

Another aspect of this invention therefore is the improvement of the clarity and colour values of the final product made from the resin processed in accordance with this invention.

The perception of color differs from one person to another.

To overcome the shortcomings of the perception and color interpretation of human eyes, models such as CIE L*a*b* (CIELAB), CIE XYZ were developed to measure and define colors more accurately.

CIELAB was developed by the International Commission on Illumination, a French organization. (Commission Internationale d'Eclairage, hence the CIE acronym in its name). The CIELAB model was originally developed based on the 'Tristimulus theory' of color perception and the human eye's response to RGB (Red, Green and Blue colors) which accurately represent human color perception.

The CIE L*a*b* color space, is a device-independent color space that provides a "universal" reference standard.

The L*a*b* space describes colors according to their position along three axes in a 3-D color space: The L axis represents the lightness or brightness of the image and is a measurement of the white-to-black content of any color. The 'a' axis runs from red to green and the 'b' axis runs from yellow to blue. Position in the L*a*b* space is defined in the following way:

L value from 0 (all black) to 100 (all white)
Position on the a axis, a range from −a (green) to +a (red)
Position on the b axis, a range from −b (blue) to +b (yellow)
Any color can be described mathematically by defining its location within this 3-D physical space.

The L*a*b* values of a color are generated by measuring the color with instruments such as a Colorimeter, Spectrophotometer, Microspectrometer, Reflectance Tintometers and the like.

The CIELAB color model was created to serve as a device independent, absolute model to be used as a reference.

CIELAB can effectively be employed in industrial color acceptability applications The plastic bottle industry has many producers, each striving to manufacture high quality products. Properties such as barrier characteristics, dimensional stability, shape and appearance are of significant importance.

Appearance attributes can include reflected color, transmitted color, yellowness, and haze. For some applications the presence of proper levels of UV inhibitors is also important. The use of color measurement instrumentation to test and quantify these attributes ensures customer satisfaction and profits.

There are two basic types of color measurement instruments used to measure colors in plastics namely the tristimulus calorimeters and calorimetric spectrophotometers. Color is measured in terms of the tristimulus color scale [the CIE L*a*b* scale discussed above]. Comparisons between a standard and a sample are expressed in terms of delta L*, delta a* and delta b* values.

Using this information, one can interpret both the size of the difference (large or small numbers) and direction of color difference (+ or −).

When determining acceptability, these numbers must fall within predetermined tolerance limits.

OBJECT OF THE PRESENT INVENTION

The main object of the present invention therefore is to provide a polyester resin comprising an additive which accelerates the SSP rate during the formation of the resin and concomitantly provides high performance characteristics hitherto unknown and particularly improved CIE L*a* and b*.

Another object of the present in invention is to provide polyethylene terephthalate resin with improved color value of the resin.

Another object of the invention is to provide a process for the preparation of polyester resins with reduced solid state polymerization processing time with improved color values of the products without affecting the reheat values, in fact improving the reheat values as required for high speed blowing.

SUMMARY OF THE PRESENT INVENTION

Accordingly, present invention provides a polyester resin with glycol insoluble tungsten-based additive, which acts not only as a co catalyst, but in addition improves the product characteristics. The process of preparing the polyester resins, particularly PET resins by making use of antimony trioxide as a catalyst and glycol insoluble tungsten compound catalysts as a co-catalyst. The tungsten compounds, typically tungsten trioxide or carbide is dispersed in the polymer matrix. The key feature of the process is that the solid state polymerization processing time is reduced, and solid state polymerization rates are increased and further the clarity, color and haze of the products are improved over known PET resins, which all suffer from grayish, or blackish or dull tinge.

Specifications of a few Raw Materials and Additives used in the Present Invention:

A. Pure Terephthalic Acid (PTA)

| | |
|---|---|
| Acid Number (mg KOH/g) | 675 ± 2 |
| Moisture (% Wt.) | 0.5 max |
| Ash (% Wt.) | 0.0015 max |
| Iron (ppm) | 1.0 max |
| Color (CIE Lab- b*) | +0.5 max |
| Bulk Density (g/cc) | 1.10 ± 0.05 |
| Foreign Particles | Nil |
| Average Particle size (micron) | 110 ± 20 |

B. Mono Ethylene Glycol

| | |
|---|---|
| Moisture (% Wt.) | 0.5 max |
| Acidity (% Wt.) (as Acetic Acid) | 0.01 max |
| Specific Gravity at 20° C. | 1.115 ± 0.001 |
| Chlorides (as Cl) ppm | 5 max |
| Iron (as Fe +++) ppm | 0.15 max |
| Residue (% Wt.) | 0.0015 max |
| Color (HU) | 10 max |
| Appearance | Colorless clear liquid No external contamination |
| Miscibility with water | 100% |
| DEG (% Wt.) | 0.1 max |
| Distillation range (° C.): | |
| 1st drop | 190 min |
| 5 ml | 196 max |
| 95 ml | 199 max |
| Dry point | 200 max |
| Ultraviolet Transmittance (%) at: | |
| 350 nm | 98 min |
| 275 nm | 95 min |
| 250 nm | 90 min |
| 220 nm | 70 min |

C. Pure Isophthalic Acid (IPA)

| | |
|---|---|
| Acid Number (mg KOH/g) | 675 ± 2 |
| Moisture (% Wt.) | 0.5 max |
| Ash (% Wt.) | 0.0015 max |
| Iron (ppm) | 1.0 max |
| Color (CIE Lab- b*) | +0.5 max |
| Bulk Density (g/cc) | 1.10 ± 0.05 |
| Foreign Particles | Nil |
| Average Particle size (micron) | 110 ± 20 |

D. Antimony Trioxide

| | |
|---|---|
| Purity (% as $Sb_3O_2$) | 99.0 min |
| Moisture (% Wt.) | 0.5 max |
| Iron (ppm) | 30 max |
| Chlorides (ppm) | 100 max |

E. Cobalt Acetate

| | |
|---|---|
| Appearance | Violet Red or Rose, Crystals/Powder |
| As Cobalt Purity (%) | 22 min |
| As Cobalt Acetate | 92 min |
| Moisture (% Wt.) | 28.0 ± 2.0 |
| Solubility in hot Ethylene | |
| Glycol at 80-100° C. | Soluble |
| Foreign Particles | Nil |
| Formula | $Co(CH_3COO)_2 \cdot 4H_2O$ |

F. Blue Toner

| | |
|---|---|
| Appearance (visual inspection) | Labeled as POLYSYNTHRIN BLUE RBL procured from Clariant India limited or similar Food grade approved special Blue Toner - 3 ppm maximum |

G. Red Toner

| | |
|---|---|
| | Labeled as POLYSYNTHRIN RED GFP procured from Clariant India limited or similar Food grade approved special Red Toner - 3 ppm maximum |

H. Orthophophoric Acid (OPA)

| | |
|---|---|
| Assay | 88% minimum |
| Wt./ml at 20° C. | About 1.75 g |
| Chloride (Cl | 0.001% maximum |
| Nitrate ($NO_3$) | 0.002% maximum |
| Sulphate ($SO_4$) | 0.01% maximum |
| Calcium & Magnesium | 0.01% maximum |
| Manganese | 0.06% maximum |

I. Triethylphosphonoacetate (TEPA)

| | |
|---|---|
| | Triethylphosphonoacetate from Rhodia - Clear, colorless liquid |
| Phosphorous content (%) | 13.8 |

J. TUNGSTEN COMPOUNDS

Tungsten Trioxide ($WO_3$): Lemon yellow or blue powder, 99.98% purity,

-continued

Molecular Weight 231.85, Specific Gravity 7.2 g/cc, 1 to 5 micron size Tungsten Carbide, is of analytical grade.

PREFERRED EMBODIMENTS OF THE INVENTION

The embodiments of the present invention are explained by referring to FIG. 1, of the accompanying drawings, which is a schematic process flow diagram of the present invention, wherein the process for production of Polyethylene Terephthalate (PET) is explained.

The preferred embodiment of the invention provides polyethylene terephthalate (PET) comprising a tungsten based glycol insoluble solid state polymerization additive selected from a group consisting of its trioxide and carbide.
  i having 15-30% increase in reactivity in solid state polymerization
  ii having improved L* value, the increase being in the range of 2-4%
  iii having improved b* values, the improvement being in the range of 1-2%

The tungsten additive that is present in the resin is in an amount ranging between 0.5 and 40 ppm, preferably in the range between 5.0 and 30.0 ppm and the particle size of the additive is 1 to 5 microns. The intrinsic viscosity of the SSP resin is in the range of 0.72 to 1.20 dl/g. The resin of the invention possess L* value in excess of 80-82 and b* value in the range of −1.0 to −2.0.

The invention also extends to a preform and a container made thereof having improved L* value in the range of 2-4% and improved b* values in the range of 1-2%.

Another aspect of this invention provides a process for the preparation of a polyester resin as mentioned above, said process comprising the steps of
  a. preparing a paste comprising of a:
    (i) diacid component selected from a group consisting of Terephthalic Acid (TPA) and
    (ii) diol component is selected from a group consisting of mono ethylene glycol (MEG);
    (iii) an antimony compound selected from a group consisting of antimony trioxide or antimony triacetate as a catalyst and
    (iv) a cobalt compound acting as toner;
  b. esterifing the paste of step (a) with addition of a glycol insoluble tungsten compound, wherein the tungsten compound is selected from tungsten trioxides and tungsten carbide and is dispersed in ethylene glycol, as a co-catalyst;
  c. optionally pre polymerizing the product of the above reaction in a pre polymerization reactor;
  d. polymerizing esterified material from step (b) or the pre polymer of step (c) in presence of antimony compound as catalyst, at a reduced pressure and heat stabilizing using phosphorous compounds to obtain pellets or amorphous polymer melt which may subsequently cast as chips; and
  e. solid state polymerizing the pellets or amorphous polymer melt to get desired IV in the polyester resin.

The process optionally comprising iso phthalic acid (IPA) added along with PTA and MEG in the range of 1 to 5% and preferably between 2 and 3%.

The esterification is carried out at a temperature in the range of about 240-275° C. and pressure in the range of 0.5 to 3.0 kg/cm$^2$ and for a period ranging between 115 to 145 minutes while maintaining inert atmosphere using nitrogen circulation.

The optional pre polymerizing of step (d) is carried out at reduced pressure in the range of 5-15 mbar and at a temperature in the range of 260-285° C. for a period of about 30 minutes.

The polymerization of step (e) is carried out at a reduced pressure in the range of 0.1 to 0.5 mbar at a temperature in the range of 292-298° C. for a period ranging between 100 and 155 minutes preferably 105 to 115 minutes.

The ratio of diacid component to diol component is about 70:30 to 90:10 weight percent The antimony compound used is in the range of 100 to 400 ppm.

The process further comprising additional toner selected from red and/or blue toner in the range of 0.2 to 3.0 ppm The tungsten compound in step (b) is selected from tungsten oxide or tungsten carbide.

The concentration of tungsten compound is 0.5-40 ppm, preferably 5-30 ppm.

Another aspect of the invention relates to the addition of tungsten compound. The tungsten compound may be added in any of three stages namely in the paste preparation vessel, in the esterification vessel or in the poly reactor.

In another embodiment of the present invention provides a process wherein
  a. the esterification is carried out at a temperature in the range of about 240-275° C. and pressure in the range of 0.5 to 3.0 kg/cm$^2$ and for a period ranging between 115 to 145 minutes while maintaining inert atmosphere using nitrogen circulation;
  b. pre polymerizing is carried out at reduced pressure in the range of 5-15 mbar and at a temperature in the range of 260-285° C. for a period of about 30 minutes;
  c. polymerization is carried out at a reduced pressure in the range of 0.1 to 0.5 mbar at a temperature in the range of 292-298° C. for a period ranging between 100 and 155 minutes preferably 105 to 115 minutes;
  d. the ratio of diacid component to diol component is about 70:30 to 90:10 weight percent;
  e. the antimony compound used is in the range of 100 to 400 ppm;
  f. additional toner selected is from red and/or blue toner in the range of 0.2 to 3.0 ppm;
  g. wherein the glycol insoluble tungsten compound is selected from tungsten oxide or tungsten carbide the concentration of tungsten compound is 0.5-40 ppm, preferably 5-30 ppm; and
  h. wherein the tungsten compound is added to the raw material slurry paste during esterification or it is separately added during polymerization In another embodiment, the process of the present invention may be a batch process or continuous process.

The present invention provides a process for increasing the productivity of the solid state polymerization by addition of a glycol insoluble tungsten compound like yellowish blue Tungsten Oxide ($WO_3$) or bluish Tungsten Carbide (WC) in the presence of the normal phosphorous based heat stabilizer and cobalt compounds and toners for color improvement.

The Process of Preparation of Polyethylene Terephthalate (PET) Comprises the Steps of:

Step (a):

PTA/MEG slurry in the ratio of 70:30 wt % made ready in the paste preparation vessel along with the required IPA, which is about 0.5 to 4% over polymer. The catalyst Antimony trioxide ($Sb_2O_3$), 100 to 400 ppm preferably 200 to 300 ppm of which is added in the paste preparation vessel along with Cobalt Acetate as the color toner. The cobalt acetate is provided along with additional red and/or blue toners. The quantity of cobalt acetate used is in the range about of 10 to 100 ppm preferably 20 to 50 ppm and the amount of red and/or blue toners used is in the range of about 0.2 to 3 ppm preferably 1 to 2 ppm. Glycol insoluble Tungsten compounds selected from Tungsten trioxide or carbide are used, co-catalysts for the preparation of PET resin. Tungsten Oxide is yellowish blue and Tungsten Carbide is blue in color. The yellowish blue $WO_3$ or the bluish WC is finely dispersed in EG (Ethylene Glycol) and is added to the paste to give concentration in the final polymer in the range of about 0.5 to 40 ppm preferably in the range of 5 to 30 ppm.

Step (b): Batch Processing:

Initially the esterifier is empty and having the temperature of 240 to 270° C. The reactor is maintained under the inert atmosphere by using the Nitrogen. The reactor pressure is maintained in the range of about 0.5 to 3.0 $Kg/cm^2$. The PTA/MEG/IPA pumping is started, and the pumping is stopped, after the required quantity of the paste is pumped into the reactor.

In the esterification reactor the PTA/IPA gets converted to BHET (bishydroxy ethylterephthalate) i.e. prepolymer or oligomer. Thus the complete mass gets converted to the BHET viz. prepolymer/oligomer with the degree of polymerization in the range of about 5 to 10.

After the first batch converted into BHET, it remains in the esterifier and acts as the PREPOLYMER HEEL. This helps to hasten all the above-mentioned unit process in the subsequent batches.

The additive co-catalyst selected from Tungsten trioxide or tungsten carbide can alternatively be added in the esterifier or in the polyreactor after the prepolymer transfer instead of being added in the paste preparing vessel. The dotted lines in FIG. 1 indicate the above aspect of the invention.

After achieving the desired end temperature of 255 to 275° C. and the conversion of ~90% of the batch processing, the esterified material is filtered through a coarse filter and transferred to the prepolyreactor by nitrogen pressure in the case of three reactor system or directly to the autoclave in the case of two reactor system. The prepolyreactor is equipped with an agitator, internal heating coil and external limpet coil. The prepolymer is processed by gradually reducing the pressure to 5-15 mbar (abs.) and increasing the temperature to about 260-285° C. where the rest of the esterification followed by pre-polymerization takes place. After an increase in DP the melt is transferred after filtration through a 20 micron filter to the Polymerization reactor, which is provided with a special agitator, condenser and a fine vacuum system. The polymerization takes place in the presence catalyst viz.Antimony Trioxide($Sb_2O_3$). Here the polymer melt with a low starting DP is raised to its required final high DP of 100-110 by reducing the pressure to as low as 0.1-0.5 mbar (abs.) and the temperature to about 280-298° C., preferably 280-285° C. The polymer melt is stabilized with heat stabilizers viz. Phosphorous Acid/OrthoPhosphoricAcid (OPA)/Triethylphosphonoacetate (TEPA) either singly or in combination (1:1 ratio) at a level of 20 to 80 ppm preferably at 40 to 70 ppm. The polymer melt is extruded under nitrogen pressure and converted into pellets in the case of a 2-Reactor system or the amorphous polymer melt which is kept under circulation with a gear pump in the case of a 3-Reactor system, is cast under vacuum yielding a better quality polymer. This amorphous copolyester FRH resin is further solid state polymerized to an IV of 0.72-1.20. In a similar manner continuous process is carried out in number of reactors.

The general reaction times are as follows:

Esterification: 115-145 minutes. Prepolymerization: ~30 minutes (If applicable as in a 3-Reactor system).

Polymerization: 125 to 155 minutes.

The amorphous polyester resin after melt polymerization which has incorporated in it the glycol insoluble tungsten based additive present in the range of 0.5 to 40.00 ppm and of particle size between 1 to 5 microns i. has L* value in the range of 73±1, ii has b* values in the range of −4.0 to −6.0 iii and has intrinsic viscosity in the range of 0.600±0.04 dl/g

This amorphous resin is taken up for solid State Polymerization for a time: 12 to 16 hours.

Although the present invention additionally gives maximum benefits in energy savings in a two-stage process, energy gains are also manifest in the single stage bottle blowing process albeit to a lower degree.

Typical properties of the Polymer:

| AMORPHOUS Polyester Resin with glycol insoluble tungsten additive | |
|---|---|
| IV: | 0.600 ± 0.04 dl/g |
| COOH end groups: | 30 ± 5 meq/kg |
| DEG, wt. %: | 1.0 ± 0.1 |
| Melting Point: | 246 ± 2° C. |
| L*(CIE): | 73 ± 1 |
| 'b*': | −4.0 to −6.0 |
| SSP Polyester Resin with glycol insoluble tungsten additive | |
| IV: | 0.840 ± 0.02 dl/g |
| COOH end groups: | <30 meq/kg |
| DEG, wt. %: | 1.0 ± 0.1 |
| Melting Point: | 246 ± 2° C. |
| L*(CIE): | 82 ± 2 |
| 'b*': | −1.0 to −2.0 |
| Similar high performance on reactivity and color has been experienced in high IV resin up to 1.20 dl/g. | |

In the present invention the catalyst, particularly $Sb_2O_3$ is functioning as the polymerization catalyst. The glycol insoluble tungsten compound is primarily added to improve the solid state polymerization rate thereby acting as a co catalyst along with $Sb_2O_3$ but it has also given an added advantage of improving the L* and b* values.

As described above the addition of WO 3 or WC not only acts as a co-catalyst and improves the SSP rate but also shows an improvement in color values.

The invention is further illustrated in the form of Examples. However, these examples should not be construed as limiting the scope of the invention.

EXAMPLE 1

PTA/MEG paste comprising 2215 kg of PTA, 50 kg IPA and 813 kg of MEG was charged to an Esterifer reactor. The paste also contained 683 gm $Sb_2O_3$ (230 ppm as Sb), 311 gm, 230 gm Cobalt Acetate (22 ppm as Co), 4.5 gm each of the Red and Blue toners (1.9 ppm each). Esterification was carried out between the temperatures 240 and 268° C. under a pressure of 2.2 bar(g). At this stage the polymer-melt was stabilized with 135 gm TEPA (50 ppm) and 50 gm OPA (50 ppm). After the esterification the prepolymer formed was filtered through a 20 micron filter and transferred to the polyreactor and 60 gm of Tungsten Oxide ($WO_3$) dispersed in 5 litres of ethylene glycol was added. The prepolymer was polymerized by gradually reducing the pressure to 5-15 mbar and increasing the temperature from 268 to 285° C. Towards the end of the process the pressure was further reduced to <1.0 mbar (abs) and the temperature increased to 280-285° C. After the requisite IV was reached as indicated by the kilowatt of the agitator polymer melt was extruded under nitrogen pressure and converted into amorphous pellets. These amorphous pellets were subjected to pre-crystallization and solid sate polymerization to increase the IV to 0.72-1.20 in a batch reactor.

Table I gives the properties of the amorphous and SSP polymer obtained from this example 1.

TABLE I

| PARAMETERS | AMORPHOUS RESIN | SSP RESIN |
|---|---|---|
| I.V. dl/g | 0.55 | 0.82 |
| IV RATE/Hr (SSP Resin) | — | 0.032 |
| L* | 73.4 | 79.9 |
| a* | −1.8 | −1.5 |
| b* | −4.4 | −1.0 |
| FRH Heat-up Rate (SSP) % Increase with respect to non FRH resin | — | 13.5 |

Thus the Tungsten compounds $WO_3$ acts as a co-catalyst and gives a reduction in melt polymerization processing time ($\geq$15%) and an increase in the rate of SSP ($\geq$25%) resulting IV build up in a shorter time as detailed in Table—II.

TABLE II

COMPARISON OF MELT POLYMERIZATION AND SSP RATE.

| Sl. No. | PROCESS PARAMETER | PET RESIN WITHOUT TUNGSTEN | PET RESIN WITH TUNGSTEN COMPOUND ADDITIVE |
|---|---|---|---|
| 1. | Polymerization time in minutes | 130 ± 5 | 110 ± 5 |
| 2. | SSP rate - IV increase/hour | 0.016 ± 0.002 | 0.020 ± 0.005 |

Tungsten compounds like $WO_3$ improves the PET resin productivity without affecting the clarity and haze in the bottles.

To measure the L, a, b values a Spectra Scan Colorimeter—5100 from Premier Colorscan was used under the following measurement conditions: Observer 2 deg Colorspace CIELAB Illuminant D65.

The comparison of the color of the product of the present invention using tungsten trioxide as co-catalyst along with other conventional processes, as reflected in their CIE 'L*' and 'b*' values is as shown in Table—III.

TABLE III

| Sample Identity | 'L*' value | 'b*' value | Reference |
|---|---|---|---|
| | 'L*' and 'b*' values: | | |
| PET Resin | — | 1.3 to 1.7 | US4408004 |
| Amorphous PET Resin | 70.0 ± 1 i.e. 69-71 | −4.0 to −5.5 | Known CSD resin |
| Amorphous Resin with Tungsten compound | 73.0 ± 1 i.e. 72-74 | −1.9 to −6.3 | Present invention |
| SSP PET Resin | 78 ± 2 76-80 | −6.0 to −7..5 | Known CSD resin |
| SSP Resin with Tungsten compound | 82 ± 2 80-84 | −1.2 to −1.9 | Present invention |
| Preforms* | 49.03 to 63.10 | 1.82 to 3.89 | US 2003/0018115 |
| FPL Preforms with Tungsten compound | 77 ± 2 75-79 | −3.0 to −4.4 | Present invention |
| FPL (SSP) - Normal CSD Preforms | 75 ± 1 74-76 | −2.1 to −3.0 | Does not contain Tungsten additive |

*Comparing resin and preform colors has limitations due to the wall thickness variations for different sizes of bottles as well as variations in instrument and analytical procedures.

As described earlier addition of tungsten compounds not only increase PET resin productivity but also improves the L* and the b* values.

EXAMPLE 2

The process of example 1 was repeated except that 60 gms of tungsten carbide powder of particle size ranging from 2 to 6 microns and dispersed in ethylene glycol was added in polyreactor. The results obtained were as follows:

| SSP rate: | 0.022 IV increase/hour |
|---|---|
| L* value | 79.8 |
| b* value: | −1.8 |
| IV: | 0.84. |

EXAMPLE 3

The process of example 1 was repeated except that 60 gms of tungsten trioxide powder of particle size ranging from 1 to 5 microns and dispersed in ethylene glycol was added in the paste preparation vessel. The results obtained were as follows:

| SSP rate: | 0.0198 IV increase/hour |
|---|---|
| L* value | 79.6 |
| b* value: | −1.3 |
| IV: | 0.83 |

EXAMPLE 4

The process of example 1 was repeated except that 60 gms of tungsten carbide powder of particle size ranging from 2 to 6 microns and dispersed in ethylene glycol was added in paste preparation vessel. The results obtained were as follows:

| SSP rate: | 0.022 IV increase/hour |
|---|---|
| L* value | 80.3 |
| b* value: | −1.5 |
| IV: | 0.81 |

EXAMPLE 5

The process of example 1 was repeated except that 60 gms of tungsten trioxide powder of particle size ranging from 1 to 5 microns and dispersed in ethylene glycol was added in the esterification reactor vessel. The results obtained were as follows:

| | |
|---|---|
| SSP rate: | 0.0196 IV increase/hour |
| L* value: | 80.2 |
| b* value: | −1.6 |
| IV: | 0.87 |

EXAMPLE 6

The process of example 1 was repeated except that 60 gms of tungsten carbide powder of particle size ranging from 2 to 6 microns and dispersed in ethylene glycol was added in the esterification reactor vessel. The results obtained were as follows:

| | |
|---|---|
| SSP rate: | 0.024 IV increase/hour |
| L* value: | 80.4 |
| b* value: | −1.4 |
| IV: | 0.83 |

EXAMPLE 7

The process of example 1 was repeated except that 30 gms of tungsten trioxide powder of particle size ranging from 1 to 5 microns and dispersed in 2.5 litres of ethylene glycol was added in the paste vessel and 30 gms of tungsten trioxide powder of particle size ranging from 1 to 5 microns and dispersed in 2.5 litres of ethylene glycol was added to the esterification reactor vessel. The results obtained were as follows:

| | |
|---|---|
| SSP rate: | 0.022 IV increase/hour |
| L* value | 80.3 |
| b* value: | −1.5 |
| IV: | 0.81 |

EXAMPLE 8

The process of example 1 was repeated except that 30 gms of tungsten trioxide powder of particle size ranging from 1 to 5 microns and dispersed in 2.5 litres of ethylene glycol was added in the paste vessel and 30 gms of tungsten carbide powder of particle size ranging from 2 to 6 microns and dispersed in 2.5 litres of ethylene glycol was added to the polyreactor vessel. The results obtained were as follows:

| | |
|---|---|
| SSP rate: | 0.028 IV increase/hour |
| L* value: | 79.9 |
| b* value: | −1.6 |
| IV: | 0.85 |

EXAMPLE 9

The process of example 1 was repeated except that a mixture of 60 gms of tungsten carbide powder and tungsten trioxide [50:50] of particle size ranging from 1 to 6 microns and dispersed in ethylene glycol was added in the esterification reactor vessel. The results obtained were as follows:

| | |
|---|---|
| SSP rate: | 0.024 IV increase/hour |
| L* value: | 80.4 |
| b* value: | −1.5 |
| IV: | 0.81 |

EXAMPLE 10

The procedure of example 1 was repeated for except for the replacement of tungsten trioxide with glycol soluble tungstic acid For this example the Sb2O3 was maintained at 240 ppm and the Sb, Cobalt Acetate at 40 ppm The cocatalyst Tungstic Acid was maintained at 60 ppm level and Phosphorous heat stabilizer at 50 ppm as P.

Compared to the melt polymerization times with the cocatalyst Tungsten Trioxide which gave 15% reduction in melt polymerization time Tungstic Acid gave only 7% reduction.

In SSP Tungsten Trioxide gave 22% increase in the rate resulting in faster I.V. build up whereas Tungstic Acid did not show any significant increase in the SSP rate when compared to the trials.

The L value obtained with Tungstic Acid (~74) was significantly lower than the L value (~80) with Tungsten Trioxide. In fact with Tungstic Acid there is no significant change in the L value by the addition of the cocatalyst.

The above studies indicate that the insoluble Tungsten Trioxide or carbide is superior to the soluble Tungstic Acid in terms of reduction in melt polymerization time, increased SSP rate and a high L value.

The resin compositions made in accordance with the invention in the aforesaid examples were converted to preforms and further converted to bottles. The preforms and bottles were tested for clarity and L* 'a' and 'b' values and were found to be superior by at least 2 to 3% than the preforms and bottles of the prior art.

ADVANTAGES

In the present invention addition of glycol insoluble Tungsten compounds like $WO_3$ or WC reduces the melt polymerization processing time by acting as a co catalyst and at the same time increase the SSP rate resulting in increased PET resin productivity. The addition levels of glycol insoluble tungsten compounds are such that the clarity and haze of the bottles manufactured using them are improved and give high L* values in the PET resin resulting in improved clarity of the PET resin.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

The invention claimed is:

1. A polyethylene terephthalate (PET) resin having therein a glycol insoluble tungsten compound additive cocatalyst selected from the group consisting of tungsten trioxide, a mixture of tungsten trioxide and tungsten carbide and tungsten carbide during the making of the resin having a particle size ranging between 1 to 5 microns, and in quantities ranging from 5.0 to 30 ppm, based on mass of resin in Ethylene Glycol.

2. A resin as claimed in claim 1 having an L* value >80% and b* value in the range of −1.2 to −1.9.

3. A preform formed from the resin according to claim 1.

4. A bottle formed from the resin according to claim 1.

5. A process for the preparation of a resin comprising the steps of:
   a. preparing a paste comprising a:
      (i) diacid component selected from a group consisting of Terephthalic Acid (TPA) and
      (ii) diol component is selected from a group consisting of mono ethylene glycol (MEG);
      (iii) an antimony compound selected from a group consisting of antimony trioxide or antimony triacetate as a catalyst; and
      (iv) a cobalt compound acting as toner;
   b. esterifing the paste of step (a)
   c. optionally prepolymerizing the product of the above reaction in a prepolymerization reactor;
   d. polymerizing esterified material from step (b) or the prepolymer of step (c) in the presence of antimony compound as catalyst, at a reduced pressure and heat stabilizing using phosphorous compounds to obtain pellets or amorphous polymer melt which may subsequently cast as chips; and
   e. solid state polymerizing the pellets or amorphous polymer chips to get desired IV of 0.72 to 1.20 in the polyester resin, wherein
   f. at least one glycol insoluble tungsten compound selected from a group consisting of tungsten trioxide, tungsten carbide and a mixture of tungsten trioxide and tungsten carbide with a particle size of 1 to 5 microns dispersed in ethylene glycol, is added 5.0 to 30 ppm to at least at one of the steps a, b, c and d.

6. The process as claimed in claim 5, wherein the esterification is carried out at a temperature in the range of about 240-275° C. and pressure in the range of about 0.5 to 3.0 kg/cm² for a period ranging between 115 to 145 minutes while maintaining inert atmosphere using nitrogen circulation.

7. The process as claimed in claim 5, prepolymerizing of step (c) is carried out at reduced pressure in the range of about 5 to 15 mbar and at a temperature in the range of about 260-285° C. for a period of about 30 minutes.

8. The process as claimed in claim 5, wherein polymerization of step (d) is carried out a reduced pressure in the range of about 0.1 to 0.5 mbar at a temperature in the range of 280-298° C., for a period ranging between 100 and 155 minutes.

9. The process as claimed in claim 5, wherein the solid-state polymerization of step (e) is carried out for a period ranging from about 12 to 16 hours.

10. The process as claimed in claim 5, wherein the ratio of diacid component to diol component is about 70:30 to 90:10 weight percent.

11. The process as claimed in claim 5, wherein the antimony compound used is in the range of 100 to 400 ppm.

12. The process as claimed in claim 5, further comprising additional toner selected from red and/or blue toner in the range of about 0.2 to 3.0 ppm
    (a) The process as claimed in claim 7, wherein in step (b) the concentration of tungsten compound is 0.1-200 ppm.

13. The process as claimed in claim 5 in which the process is a batch process.

14. The process as claimed in claim 5, in which the process is a continuous process.

15. The resin of claim 1 wherein the particle size range is between 1 and 5 microns.

16. The product of claim 1 wherein the amount is 0.5 to 6.0 ppm.

17. The process of claim 8 wherein the temperature is 280 to 285° C.

18. The process of claim 8 wherein the polymerization time is 105 to 115 minutes.

* * * * *